(12) United States Patent
Schulmayr et al.

(10) Patent No.: US 6,392,386 B2
(45) Date of Patent: May 21, 2002

(54) DEVICE AND PROCESS FOR OPERATING A RECHARGEABLE STORAGE FOR ELECTRICAL ENERGY

(75) Inventors: Günter Schulmayr, Neubiberg; Dirk A. Fiedler, Ismaning; Hans Leysieffer, Taufkirchen, all of (DE)

(73) Assignee: Cochlear Limited, Lane Cove NSW (AU)

( * ) Notice: Subject to any disclaimer, the term of this patent is extended or adjusted under 35 U.S.C. 154(b) by 0 days.

(21) Appl. No.: 09/809,087

(22) Filed: Mar. 16, 2001

(30) Foreign Application Priority Data

Mar. 16, 2000 (DE) .......................... 100 12 964

(51) Int. Cl.$^7$ .................. H01M 10/44; H01M 10/46
(52) U.S. Cl. ..................................... 320/132
(58) Field of Search ................. 320/124, 125, 320/128, 132, 135, 137, 138, 149

(56) References Cited

U.S. PATENT DOCUMENTS

| | | | |
|---|---|---|---|
| 5,256,957 A | | 10/1993 | Wiesspeiner |
| 5,714,866 A | * | 2/1998 | S et al. |
| 5,739,672 A | * | 4/1998 | Lane |
| 5,825,156 A | * | 10/1998 | Patillon et al. |
| 6,064,180 A | * | 5/2000 | Sullivan et al. |

OTHER PUBLICATIONS

Thaddaus Leonhard Halaczek et al., "Batterien und Ladekonzepte", Mit 155 Abbildugen und 20 Tabellen, 2., verbesserte Auflage, pp. 246–248. No date.

Halaczek/Radecke, "Batterien und Ladekonzepte", 2., verbesserte Auflage, pp. 154–237. No date.

Mirna Urquidi–Macdonald et al., "Predicting Failure of Second Batteries", Journal of Power Sources 74 (1998) pp. 87–98.

Alvin J. Salkind et al., "Determination of State–of–Charge and State–of–Health of Batteries by Fuzzy Logic Methodology", Journal of Power sources 80 (1999) pp. 293–300.

Kevin Martin Bossley, "Neurofuzzy Modelling Approaches in System Identification", University of Southampton, May 1997, pp. 94–156.

* cited by examiner

*Primary Examiner*—Edward H. Tso
(74) *Attorney, Agent, or Firm*—Nixon Peabody LLP; David S. Safran

(57) ABSTRACT

A device for operating a rechargeable storage for electrical energy, comprising a charging module for providing electric power to charge the storage; a data acquisition module for continually acquiring instantaneous operating parameters of the storage during operation; a prediction module having implemented an adaptive model for deriving from data describing a state of the storage before start-up and data acquired in operation and optionally acquired from other expert knowledge predictions about future states of the storage, the model being operable to be automatically optimized continuously using data acquired in operation and optionally using further expert knowledge; a data memory, and a control module for controlling the charging module, the control module being operable to choose an instantaneous charging strategy for the storage depending on predictions derived from the model and on currently acquired operating parameters of the storage. Furthermore the invention relates to a process for operating a rechargeable storage for electrical energy.

19 Claims, 3 Drawing Sheets

DEVICE AND PROCESS FOR OPERATING A RECHARGEABLE STORAGE FOR ELECTRICAL ENERGY

BACKGROUND OF THE INVENTION

1. Field of the Invention

This invention relates to a device and a process for operating a rechargeable storage for electrical energy.

2. Description of Related Art

A survey of currently used charging strategies and charging devices for rechargeable electrochemical batteries can be found in Halaczek/Radecke *Batteries and Charging Concepts,* 2nd edition, 1998, Franzis' Verlag GmbH, pages 154 to 236. Conventionally, the approach is to choose a certain charging strategy depending on the battery type, wherein, during charging, the voltage and/or the current of the charging device is controlled depending on the time which has elapsed since the start of the charging process, the measured instantaneous battery voltage, the measured instantaneous current flowing in the charging circuit, and/or the measured instantaneous battery temperature, i.e., for control of the charging process, the instantaneous measured values relating to the battery or quantities derived therefrom (for example, the variation as a function of time) are used. These known processes and devices are disadvantageous in that, generally, the instantaneous charging state and the instantaneous qualitative state of the battery cannot be determined from the instantaneous measured values for voltage, current and temperature so accurately that a charging strategy which is optimized with respect, for example, to charging time or service life of the battery can be found.

On pages 246 to 248 of the aforementioned reference, digital charging devices are described in which the charging state of the battery is determined by measuring the discharge current and the temperature of the battery at regular intervals during discharging, the results being stored in an internal interrogated $E^2PROM$.

U.S. Pat. No. 5,256,957 discloses a charging process in which a characteristic parameter which is derived from the equivalent network of the battery and which is determined continuously from the currently measured charging current and the currently measured battery voltage is used to determine the shut-off time for the charging process. Here, the charging process is terminated as soon as the variation over time of the characteristic parameter approaches zero. In this case too, the charging strategy is determined from the instantaneous measured values of the battery parameters.

"Determination Of State-Of-Charge And State-Of-Health Of Batteries By Fuzzy Logic Methodology" by Salkind et al., *Journal of Power Sources* 80, 1999, pages 293 to 300, discloses using fuzzy logic to predict the charging state of an electrochemical battery based on frequency-dependent resistance measurements (electrochemical impedance spectroscopy) of the battery. The membership function and rule set of the fuzzy logic are found using a neural network.

In "Predicting Failure Of Secondary Batteries" by M. Urquidi-Macdonald et al., *Journal of Power Sources* 74, 1998, pages 87 to 98, it is proposed that the future discharge behavior of an electrochemical battery, i.e., the voltage behavior over time for a stipulated charging current behavior at a certain temperature, be predicted by means of a neural network, the neural network being trained with already conducted measurements of the charging and discharging cycles (current, voltage, temperature). Here, it is recommended that the amount of data used for training be reduced, for example, by a wavelet transform.

SUMMARY OF THE INVENTION

The primary object of this invention is to devise a device and a process for operating a rechargeable storage for electrical energy, using an optimized charging strategy, which, for example, enables a maximized efficient storage service life.

This and other objects are achieved by a device and process for operating a rechargeable storage for electrical energy and a process in accordance with the invention by implementation of an adaptive model of the storage which is automatically optimized continuously using the data acquired in operation. In this way, it always is possible to describe, know and predict the storage state as precisely as possible, and as a result of accurate and continually updated knowledge of the storage state, the charging strategy which is most favorable at the instant can be chosen.

Preferably the adaptive model is implemented by means of neural networks and/or fuzzy logic.

In the following, advantageous embodiments of the invention are explained in detail with reference to the accompanying drawings.

DETAILED DESCRIPTION OF THE INVENTION

Figure 1:
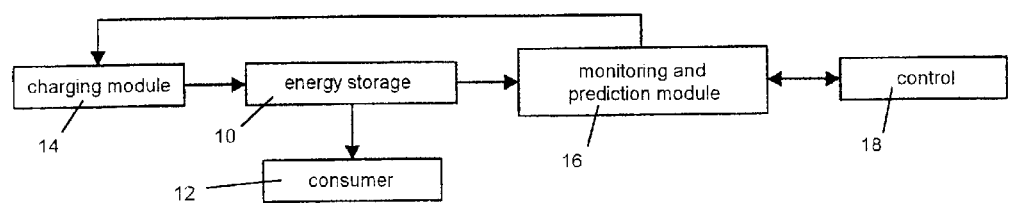
FIG. 1 schematically shows the concept of a charging system of the invention.

FIG. 1 schematically shows the overall concept of a charging system, wherein a rechargeable electrical energy storage 10 supplies a consumer 12 with electrical energy. There is a charging module 14 for providing electrical power for charging of the energy storage 10. A combined control and prediction module 16 is used to prepare predictions regarding the instantaneous state and future states of the energy storage 10 using available data with respect to the history and the instantaneous state of the energy storage 10; they are used to choose the instantaneous charging strategy for the energy storage 10 and to control the charging module 14 accordingly.

When the energy storage 10 is started up, the control and prediction module 16 is dependent on data which, for example, were determined in the production of the energy storage 10 and which describe the state of the energy storage 10 before start-up. In operation, the module 16 then continually collects instantaneous measurement data, i.e., the current drained from the energy storage 10 or supplied to it, the voltage of the energy storage 10 and quantities derived therefrom, especially the variation of current and voltage over time, these acquired data being incorporated into the predictions to update and optimize them. For data acquisition, there is a data acquisition module 22 (not shown in FIG. 1).

One important aspect is that the predictions of the prediction module 16 are prepared by means of an adaptive model, the model being made such that it is continuously optimized using the measurement data acquired in the operation of the data acquisition module. The adaptive model is based preferably on so-called neuro-fuzzy logic as is explained in detail below. The information regarding the operating history of the energy storage 10 thus plays a part in the continuing improvement of the model for the respective energy storage 10 by continuous adaptation via the instantaneous measured values so that the operating history of the energy storage 10 is automatically considered in the preparation of state predictions.

Furthermore, there is an control interface 18 in FIG. 1 so that, on the one hand, the predictions determined by the prediction module 16 with regard to the energy storage 10 can be output, and on the other hand, the user can access the charging system in order to implement, for example, an emergency-off function or to input special updated data with respect to the energy storage 10 so that they can be considered by the adaptive model.

This invention is not limited to certain types of energy storages. Thus, electrochemical batteries, for example, NiCd, NiMH, Li ion, Li, Pb, AgMH, $Zn/MNO_2$ cells, fuel cells, such as, for example, AFC (alkali fuel cell), PEM (polymer electrolyte fuel cell), DMFC (direct methanol fuel cell), PAFC (phosphoric acid fuel cell), MCFC (liquid carbonate fuel cell), SOFC (solid oxide fuel cell), passive components, such as, for example, special capacitors and combinations thereof, can be used.

Figure 2:
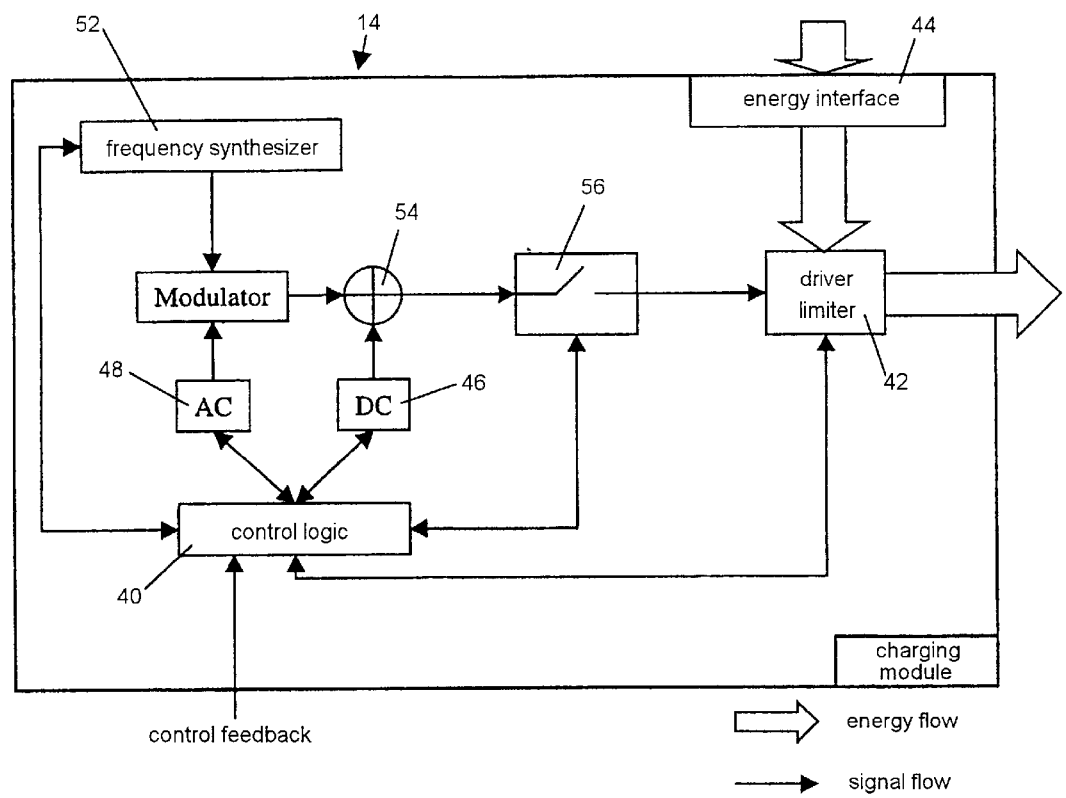
FIG. 2 schematically shows the structure of the charging module of a charging system of the invention.

FIG. 2 schematically shows an example of the structure of the charging module 14. A control logic 40 controls the output of the charging module 14 to the energy storage 10 by controlling, via a driver/limiter 42 which can be turned off, the flow of electric power which is made available via an energy interface 44 which may be connected by wire or in a wireless manner. To produce the control signals for the driver/limiter, there are a DC generator 46, an AC generator 48, a frequency synthesizer 50, a modulator 52, an adder 54 and a switch 56. The switch 56 is provided, for example, for pulsed signals or for shut off. The DC generator 46, the AC generator 48, the frequency synthesizer 50 and the switch 56 are controlled directly by the control logic 40. The charging module is designed for great flexibility and can deliver DC and AC signals at a constant current or constant voltage which can be pulsed and/or modulated.

Figure 3:
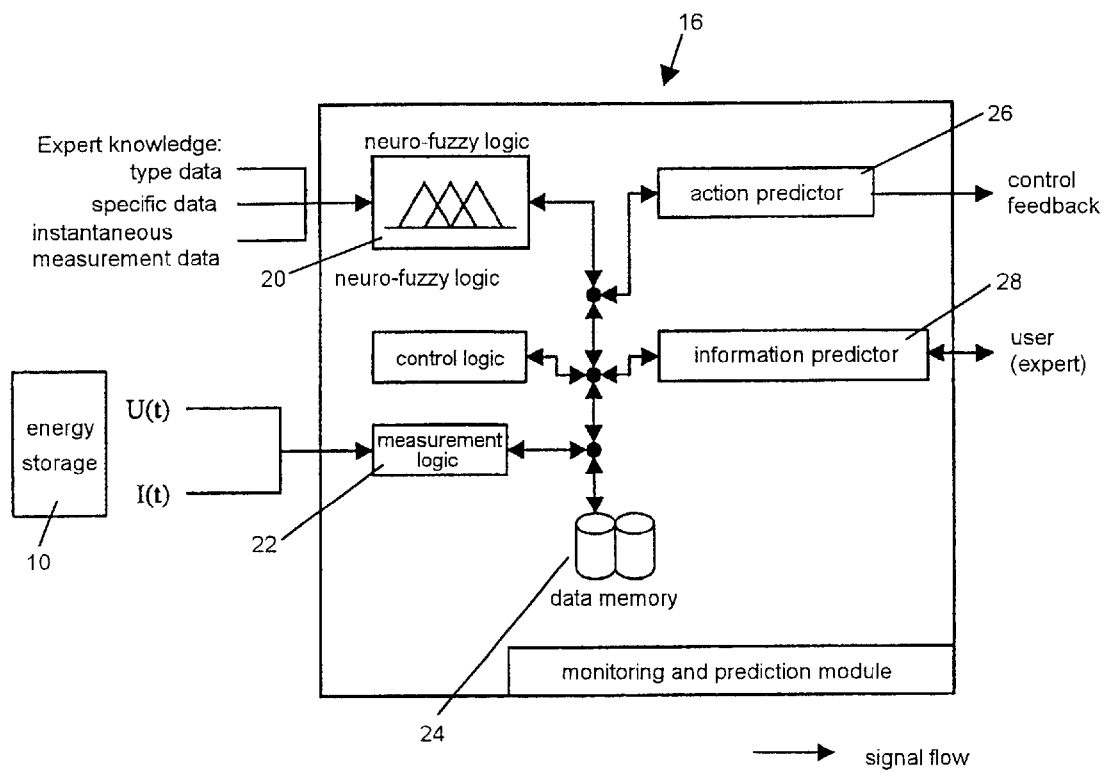
FIG. 3 schematically shows the structure of a control and prediction module of a charging system of the invention.

FIG. 3 schematically shows an example of the structure of the control and prediction module 16. The central element thereof is a neuro-fuzzy logic 20, which can be made such that the membership function and the rule set are found by means of one or more neural networks. Examples of use of neuro-fuzzy logic can be found in the initially mentioned article of Salkind et al. There are numerous software toolboxes for neural networks and fuzzy logic, for example, in the programming language Matlab, and many of these toolboxes can be obtained via the Internet. Among them are a number of toolboxes which allow combined use of fuzzy logic and neural networks in the sense of neuro-fuzzy logic. In particular, also hybrid neuro-fuzzy logic can be used; it can be made, for example, in two stages, the input data being supplied, for example, to two different neuro-fuzzy logics and the output values thereof being supplied to a third neuro-fuzzy logic as input values, the output values of the latter ultimately providing the desired result. An example of hybrid systems can be found in K. M. Bossley, *Neurofuzzy Modeling Approaches in System Identification*, Ph.D. thesis, University of Southhampton, Department of Electronics and Computer Science, 1997, pages 94 to 156.

A major task of the prediction module 16 consists in obtaining, from known data for the energy storage 10 which reflect the operating history thereof, predictions regarding the instantaneous storage state and the evolution of the storage state in the future. Here, a prediction as accurate as possible is derived from the existing data sets. In doing so, it must be considered that, for example, in batteries, in the course of operation, changes of battery properties occur which develop only slowly and which are of very small, for example, corrosion reactions or slow changes of the mechanical and geometrical properties. The simple analytic battery models ordinarily used are not able to model these changes of battery properties with sufficient accuracy. In particular, they are unable to analytically simulate the changes of the internal battery properties from the easily accessible measurement quantities, i.e., voltage, current and temperature behavior. For this reason, such an analytic description is omitted here, and instead, an attempt is made to reach a prediction into the future with sufficient accuracy by means of a self-learning model directly from as many available data as possible regarding the history of the energy storage in order to predict, for example, on the one hand, the service life of the energy storage, or on the other hand, to choose, for example, the optimum charging strategy which, for example, leads to charging as fast as possible or to charging as carefully as possible or charging of the energy storage as energy-efficiently as possible. With consideration of the long-term lifetime prediction, for example, the charging strategy can be chosen such that the expected lifetime of the energy storage is optimized.

Before start-up of a specific energy storage 10, there are still no data which had been measured in the operation of this specific energy storage 10. For this reason, the neuro-fuzzy logic 20, at this time, can use only data which describe the state of the energy storage 10 before start-up. They can be, on the one hand, type data, i.e., data which are specific to the type of the energy storage 10, or data characteristic to the individual energy storage 10, for example, data which were determined in the production of the energy storage 10. They are physical or chemical data, for example, the mass, dimensions or geometrical characteristics, the porosity and grain sizes including their three-dimensional distributions and electrical characteristic data, such as the frequency-dependent impedance of the energy storage 10. In addition, the starting configuration of the neuro-fuzzy logic 20 is preset. As soon as operation of the energy storage 10 has begun, the prediction module 16 can acquire, by means of a measurement module 22, instantaneous measurement data, for example, with respect to the current from or to the energy storage 10 and to the voltage present on the storage terminals, each as a function of time, which are stored as data sets in a data memory 24 for later use. Using the operating history of the storage 10 which has been recorded in this way, the neuro-fuzzy logic 20 is subjected to regular retraining to continually improve the prediction accuracy for the specific energy storage 10, i.e., the model of the storage 10 becomes more accurate with increasing operation time.

It is an important aspect of the invention that, in this way, for predicting the storage state, not only instantaneous measured values are used, but rather the entire operating history of the energy storage 10, if possible. It is only thereby that long-term predictions into the future are possible, for example, with respect to the service life of the energy storage 10.

Preferably, the acquired measurement data sets are pre-processed before being processed by the neuro-fuzzy logic 20. In doing so, for example, a wavelet transform can be used to eliminate noise and to provide for data compression without significant loss of accuracy. However, statistical processes also can be used.

The output of the neuro-fuzzy logic 20 is operatively connected to an action predictor module 26 and an information predictor module 28. The action predictor module 26 is used to convert the predictions of the neuro-fuzzy logic 20 into short-term and long-term control of the charging module 14, wherein, for example, a charging strategy can be chosen such that the expected lifetime of the energy storage 10 is optimized. The information predictor module 28 is used as the interface 18 for the user to output, for example, the instantaneous prediction for the expected lifetime of the energy storage 10 and assistance for maintenance of the energy storage 10 or the time remaining until the next required charging process at the instantaneous load caused by the consumer 12. Furthermore, for example, the remaining duration of the charging process can be output. On the other hand, via this interface, the user can also influence the control of the charging module 14, for example, by inputting an emergency-off signal. Furthermore, the user can also input, for example, updated expert knowledge regarding the type of energy storage used; this is of special interest when the lifetime of the energy storage 10 extends over many years.

The energy storage 10 is, for example, preferably, the power supply part of an implant in the human body, for example, a hearing system. Here, charging of the energy storage takes place by transcutaneous transmission of electrical energy from the energy transmitting part of the charging module 14 to a corresponding energy receiving part of the energy storage 10. In such a system, it is especially important, on the one hand, to know the instantaneous charging state of the energy storage, and on the other hand, to also have available a reliable prediction of its entire lifetime.

Figure 4:
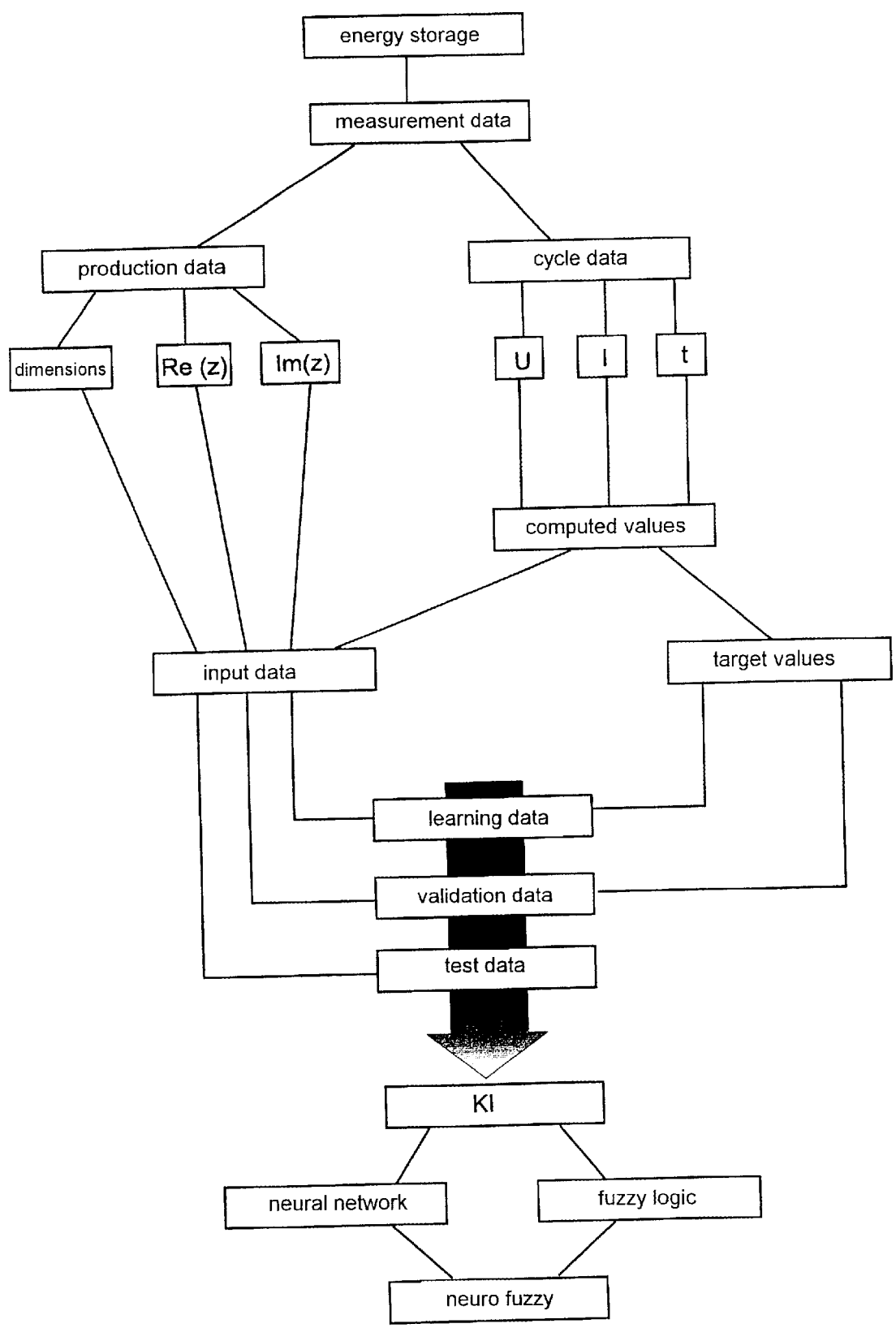
FIG. 4 schematically shows one example for the data flow in an adaptive model as is used in the charging system of the invention.

FIG. 4 schematically shows the data flow of the neuro-fuzzy logic 20 of the prediction module 16. For training of the neuro-fuzzy logic 20 the available data are divided into learning data, validation data and test data. In the first stage the learning data are fed to the neuro-fuzzy logic and the parameters thereof are changed until the pertinent target values which correspond to the input data are reproduced as well as possible. Using the validation data then the success of learning can be checked. Learning and validation can however also take place at the same time. Finally, a final check of the model can be done using the test data.

Determining the initial parameters of the neuro-fuzzy logic can also be performed externally and then transmitted to the charging control.

We claim:

1. A device for operating a rechargeable energy storage for electrical energy, comprising:
    a charging module for providing electric power to charge the energy storage;
    a data acquisition module for continually acquiring instantaneous operating parameters of the energy storage during operation;
    a prediction module having an adaptive model for deriving from data describing a state of the storage before start-up and data acquired in operation, the model being operable to be automatically optimized continuously using data acquired in operation;
    a data memory, and
    a control module for controlling the charging module, the control module being operable to choose an instantaneous charging strategy for the storage depending on predictions derived from the model and on currently acquired operating parameters of the storage.

2. The device as claimed in claim 1, wherein the adaptive model is based on at least one of one or more neural networks and fuzzy logic.

3. The device as claimed in claim 2, wherein the adaptive model is based on a neuro-fuzzy logic for finding a membership function and rule set by using one or more neural networks and for learning from data and expert knowledge.

4. The device as claimed in claim 3, wherein the neuro-fuzzy logic comprises several stages.

5. The device as claimed in claim 3, wherein the neuro-fuzzy logic is operable to be initialized before start-up of the storage using data describing a state of the storage at start-up and to be retrained using data acquired in operation and using updated expert knowledge.

6. The device as claimed in claim 1, wherein the data describing the state of the storage at start-up are at least one of production data of the storage, storage type-specific data and empirical values relating to the storage.

7. The device as claimed in claim 6, wherein the production data of the storage are at least one of storage mass, storage dimensions, geometrical characteristics, storage porosity, grain sizes, and three-dimensional distributions and electrical characteristic data thereof.

8. The device as claimed in claim 1, further comprising a communication interface for communication with a user.

9. The device as claimed in claim 8, wherein the communication interface is operable to input information from a user for consideration by the prediction module.

10. The device as claimed in claim 8, wherein the communication interface is adapted to enable outputting of predictions determined by the prediction module, with the predictions being selected from predictions regarding the time remaining until a next required charging process, a lifetime of the storage, and charging instructions, and outputting of system information.

11. The device as claimed in claim 1, wherein the prediction module is adapted to predict a lifetime of the energy storage and a charging strategy is for optimizing the predicted lifetime of the energy storage.

12. The device as claimed in claim 1, wherein the device is adapted to preprocess data used by the prediction module for the model.

13. The device as claimed in claim 12, wherein the device is adapted to subject data used by the prediction module for the model to a wavelet transform in order to reduce the quantity of data.

14. The device as claimed in claim 1, wherein the acquired operating parameters of the energy storage are instantaneous voltage of the storage and instantaneous current in a storage circuit and the time of measurement.

15. The device as claimed in claim 1, wherein the storage has an energy receiving part and forms part of an implant, the charging module having an energy transmitter to charge the energy storage by transcutaneous transmission of electrical energy to the receiving part.

16. The device as claimed in claim 15, wherein the implant is a hearing system.

17. The device as claimed in claim 1, wherein the storage is one of a NiCd, Ni metal hydride, Li and Li ion battery.

18. The device as claimed in claim 1, wherein the adaptive model of the prediction module is also adapted to be derived and optimized from externally inputted expert knowledge.

19. A process for operating a rechargeable storage for electrical energy, comprising the steps of:
    providing data describing a state of the rechargeable storage before start-up;
    continually acquiring instantaneous operating parameters of the rechargeable storage during operation;

forming an adaptive model to derive, from data describing the state of the rechargeable storage before start-up and data acquired in operation, predictions as to future states of the rechargeable storage, and continuously automatically optimizing the model using the data acquired in operation; and choosing an instantaneous charging strategy for the rechargeable storage depending on predictions derived from the model and currently acquired operating parameters of the rechargeable storage.

* * * * *